United States Patent
Duchesne

(10) Patent No.: US 7,930,499 B2
(45) Date of Patent: Apr. 19, 2011

(54) METHOD TO ACCELERATE BLOCK LEVEL SNAPSHOTS IN ARCHIVING STORAGE SYSTEMS

(75) Inventor: Raymond Duchesne, Round Hill, VA (US)

(73) Assignee: Digi-Data Corporation, Columbia, MD (US)

( * ) Notice: Subject to any disclaimer, the term of this patent is extended or adjusted under 35 U.S.C. 154(b) by 376 days.

(21) Appl. No.: 12/228,768

(22) Filed: Aug. 15, 2008

(65) Prior Publication Data

US 2009/0049261 A1  Feb. 19, 2009

Related U.S. Application Data

(60) Provisional application No. 60/964,988, filed on Aug. 15, 2007.

(51) Int. Cl.
*G06F 12/00* (2006.01)

(52) U.S. Cl. ........ 711/162; 711/112; 711/114; 711/156; 707/625; 707/639; 707/649; 707/657

(58) Field of Classification Search .................. 711/162, 711/112, 114, 156; 707/625, 639, 649, 657
See application file for complete search history.

(56) References Cited

U.S. PATENT DOCUMENTS

| | | | |
|---|---|---|---|
| 6,460,054 B1 | 10/2002 | Grummon | |
| 6,751,715 B2 | 6/2004 | Hubbard et al. | |
| 6,892,211 B2 | 5/2005 | Hitz et al. | |
| 6,938,134 B2 | 8/2005 | Madany | |
| 7,055,010 B2 | 5/2006 | Lin et al. | |
| 7,085,785 B2 | 8/2006 | Sawdon et al. | |
| 7,127,578 B2 | 10/2006 | Nagata | |
| 7,243,198 B2 * | 7/2007 | Berkowitz et al. | 711/162 |
| 7,383,404 B2 * | 6/2008 | Barnes et al. | 711/158 |
| 7,404,051 B2 * | 7/2008 | Shitomi | 711/162 |
| 7,721,057 B2 * | 5/2010 | Berkowitz et al. | 711/162 |
| 2002/0083037 A1 | 6/2002 | Lewis et al. | |
| 2006/0047931 A1 | 3/2006 | Saika | |

* cited by examiner

*Primary Examiner* — Stephen C Elmore
(74) *Attorney, Agent, or Firm* — Herbert F. Ruschmann

(57) ABSTRACT

A device and method for connection to a host and transferring data between the host and data storage assembly. The device is preferably a storage system which initializes a logical unit (LUN) in the storage assembly. A persistent memory stores a data representation of clean areas in the LUN. The storage system receives data to be written from the host to a destination area in the LUN, and determines if the destination area in the LUN is a clean area or a dirty area as indicated in the persistent memory. The storage system effects a snapshot copy of data from the destination area in the LUN to an archive storage device of the storage assembly only if the destination area is not entirely a clean area. Bandwidth is likewise reduced in LUN copy and reconstruction operations.

25 Claims, 9 Drawing Sheets

METHOD TO ACCELERATE BLOCK LEVEL SNAPSHOTS IN ARCHIVING STORAGE SYSTEMS

RELATED APPLICATIONS

This application claims benefit of the filing date of Aug. 15, 2007, of U.S. provisional patent application 60/964,988, and incorporates same herein by reference.

BACKGROUND

The present invention provides a simple method to accelerate LUN snapshots and decrease their bandwidth requirements in a block-level archiving system. The same method also allows for savings in disk reconstruction or replacement time in an archiving RAID system. The method allows LUN snapshots to be effected at a lower level of the storage device has the advantage of saving bandwidth where it counts most: the host internal and I/O busses.

Referring to FIG. 1, providers of block-level storage provide their version of snapshot and/or related services like volume copy implemented by a disk controller 20 controlling disks 30, and providing a host 10 access to the disks 30. The storage controller 20 interconnects with the host 10 via host side pipes 12. The storage controller 20 also interconnects with the disks 30 via disk side pipes 14. The storage controller 20 further interconnects with other controllers via additional pipes 16 for, inter alia, shadowing purposes. Equivalent services can be implemented at the host system level where knowledge of the file system can allow for a much finer control of the process. However, such services consume bandwidth where it counts most: the host internal and I/O busses.

SUMMARY

An object of the present invention is to reduce bandwidth requirements for cache and other operations of controllers used to transfer data to and from a host from a data storage assemblage. Preferably, the data storage assemblage is one used for archive storage and the invention reduces bandwidth requirements for providing snapshot storage of old data prior to writing data to a location whereat the old data was stored.

Another object of the present invention is to provide a device and method for reducing bandwidth requirements for cache and other operations of a storage system in effecting LUN copying.

Still another object of the present invention is to provide a device and method for reducing bandwidth requirements for cache and other operations of a storage system in effecting LUN reconstruction.

Briefly stated, the present invention provides a storage system and method for operating a storage system for connecting to a host and for writing data from the host to a storage device, and writing data from the storage device to preferably an archive storage device. The storage system includes a unit for initializing a logical unit (LUN) in the storage device, and a persistent memory storing a data representation of clean areas in the LUN which have not been written to since the initialization and dirty areas of the LUN which have been written to after the initialization. The storage system supports snapshot archiving and further includes a data writing portion for receiving data to be written from the host to a destination area in the LUN, and a determination device which determines if the destination area in the LUN is a clean area or a dirty area as indicated in the persistent memory. The data writing portion includes a first copying portion for copying data from the destination area in the LUN to the archive storage device as a snapshot if it is not determined that the destination area in the LUN is entirely a clean area and then storing the received data from the host to the destination area of the LUN. The data writing portion further includes a second copying portion for storing the received data from the host to the destination area of the LUN without first copying data from the destination area in the LUN to the archive storage device as a snapshot if it is determined that the destination area in the LUN is entirely a clean area. The method provided is implemented by configuring the storage control to effect the above operations.

An embodiment of the present invention provides a storage system for effecting a block-level protocol connection between a host and a data storage medium for writing data from the host to a first storage area of the data storage medium, and for writing data from the first storage area to a second storage area. The storage system includes a unit for initializing a logical unit (LUN) in the first storage area, a persistent memory storing a data representation of clean areas in the LUN which have not been written to since the initialization, and a writing system for receiving data to be written from the host to a destination area in the LUN and saving the received data in a cache memory. The writing system is configured to examine the data representation of the clean areas and determine if the destination area in the LUN is a clean area based on the data representation in the persistent memory. The writing system removes from the data representation of the clean areas in the persistent memory, an area containing the destination area when it is determined that the destination area in the LUN is a clean area. The writing system does not alter the data representation in the persistent memory when it is determined that the destination area in the LUN is not a clean area. Finally, the storage system includes a read/write controller which effects reading and writing of data to and from the LUN, and the read/write controller being configured to carry out the reading and writing of data to and from the LUN except when an area in the LUN which is a target of either the reading and writing of data is determined to be a clean area based on the data representation in the persistent memory.

An optional feature of the present invention provides the above embodiment wherein the writing system removes, from the data representation of the clean areas in the persistent memory, a contiguous clean area when it is determined that the contiguous clean area which will remain after a write to the LUN is less than a predetermined size. An implementation of the feature includes an embodiment wherein the LUN is divided into fragments of a predetermined size, the writing system removes the contiguous clean area which will remain after a write to the LUN when a start address and an end address of the contiguous clean area that will remain are contained in a common fragment, and the predetermined size is in a range of about 1 GB to about 100 GB. In a preferred embodiment the predetermined size is about 10 GB.

A feature of the present invention which is optionally included provides a variation of the above-described embodiments wherein the read/write controller includes: a first copying device for reading data from the destination area in the LUN and writing the read data to the second storage area to thereby copy the read data as a snapshot, if it is not determined that the destination area in the LUN is entirely a clean area based on the data representation in the persistent memory, and then storing the received data from the host to the destination area of the LUN; and a second copying device for storing the received data from the host to the destination area of the LUN without first copying data from the destination area in the LUN to the second storage as a snapshot if it is determined that the destination area in the LUN is entirely a clean area based on the data representation in the persistent memory. In a preferred arrangement the destination area is at least one block level in size.

Another feature of the present invention which is optionally included provides a variation of the above-described embodiments wherein the read/write controller is configured such that the reading and writing of the data includes a LUN copy operation which copies data of the LUN to another LUN in the storage medium, and the read/write controller includes: a first copying device for reading data from a source area in the LUN if it is not determined that the source area in the LUN is entirely a clean area based on the data representation in the persistent memory, then writing the read data to a corresponding area in the another LUN to thereby copy the read data, and proceeding to process a next source area; and a second copying device for preventing reading data from the source area if it is determined that the source area in the LUN is entirely a clean area based on the data representation in the persistent memory, and for proceeding to process a next source area.

Yet another feature of the present invention which is optionally included provides a variation of the above-described embodiments wherein the second copying device writes zeroing data to an area in the another LUN corresponding to the source area of the LUN in addition to the preventing reading data from the source area if it is determined that the source area in the LUN is entirely a clean area based on the data representation in the persistent memory.

Still another feature of the present invention which is optionally included provides a variation of the above-described embodiments wherein the read/write controller is configured such that the reading and writing of the data includes a LUN reconstruction operation which reconstructs data of a failed storage element of the LUN from reconstruction data stored in another area in the storage medium and saves the reconstructed data in a functional storage element which is one of a new storage element and a repaired storage element. In the embodiment variation the read/write controller includes a first reconstruction device for reading reconstruction data from the another area if it is not determined that a destination area in the functional storage element corresponds to an area of the failed storage element that is entirely a clean area based on the data representation in the persistent memory, then for operating to reconstruct data using the reconstruction data and write the reconstructed data to the destination area in the functional storage element, and proceeding to process a next a next area of the failed storage element to be reconstructed. The read/write controller further includes a second reconstruction device for preventing reading reconstruction data from the another area and reconstructing data if it is determined that a destination area in the functional storage element corresponds to an area of the failed storage element that is entirely a clean area based on the data representation in the persistent memory, and for proceeding to process a next a next area of the failed storage element to be reconstructed.

A further feature of the present invention which is optionally included provides a variation of the above-described embodiments wherein the second reconstruction device writes zeroing data to an area in the functional storage element corresponding to an area of the failed storage element in addition to the preventing reading reconstruction data from the another area if it is determined that the destination area in the functional storage element corresponds to an area in the failed storage element that is entirely a clean area based on the data representation in the persistent memory.

A further variation of the present invention includes the above embodiments wherein the data storage medium is an assemblage of data storage devices.

Still further, variations of above embodiments of the present invention include operation wherein the data representation of the clean areas in the persistent memory is not updated with information tracking further writes to areas not included in the representation of the clean areas.

The present invention also includes an embodiment as a method for reducing cache bandwidth usage in a storage system effecting a block-level protocol connection between a host and a data storage medium for writing data from the host to a first storage area of the data storage medium, and for writing data from the first storage area to a second storage area. The method includes initializing a logical unit (LUN) in the first storage area, storing in a persistent memory a data representation of clean areas in the LUN which have not been written to since the initialization, receiving data to be written from the host to a destination area in the LUN and saving the received data in a cache memory and examining the data representation of the clean areas and determining if the destination area in the LUN is a clean area based on the data representation in the persistent memory. The method further provides for removing, from the data representation of the clean areas in the persistent memory, representation of an area containing the destination area when it is determined that the destination area in the LUN is a clean area, and also for not altering the data representation in the persistent memory when it is determined that the destination area in the LUN is not a clean area. Additionally, the method includes effecting reading and writing of data to and from the LUN except when an area in the LUN which is a target of either the reading and writing of data is determined to be a clean area based on the data representation in the persistent memory.

An optional feature of the present invention provides the above method embodiment wherein the removing, from the data representation of the clean areas in the persistent memory, removes a contiguous clean area when it is determined that the contiguous clean area which will remain after a write to the LUN is less than a predetermined size. A variation of this feature provides that the LUN is divided into fragments of a predetermined size, and the removing the contiguous clean area which will remain after a write to the LUN is done when a start address and an end address of the contiguous clean area that will remain are contained in a common fragment, and the predetermined size is in a range of about 1 GB to about 100 GB. In a preferred embodiment the predetermined size is about 10 GB.

A feature of the present invention which is optionally included provides a variation of the above-described method embodiments wherein the effecting the reading and writing of the data includes a LUN snapshot process comprising: determining whether the destination area in the LUN is entirely a clean area based on the data representation in the persistent memory; reading data from the destination area in the LUN and writing the read data to the second storage area to thereby copy the read data as a snapshot, if it is not determined that the destination area in the LUN is entirely a clean area based on the data representation in the persistent memory, and then storing the received data from the host to the destination area of the LUN; and storing the received data from the host to the destination area of the LUN without first copying data from the destination area in the LUN to the second storage as a snapshot if it is determined that the destination area in the LUN is entirely a clean area based on the data representation in the persistent memory. In an optional preferred embodiment the destination area is at least one block level in size.

Another feature of the present invention which is optionally included provides a variation of the above-described method embodiments wherein the reading and writing of the data includes a LUN copy operation which copies data of the LUN to another LUN in the storage medium the method for the LUN copy operation includes: determining whether a source area in the LUN is entirely a clean area based on the data representation in the persistent memory; reading data from the source area in the LUN if it is not determined that the source area in the LUN is entirely a clean area based on the data representation in the persistent memory, then writing the read data to a corresponding area in the another LUN to thereby copy the read data; preventing reading data from the source area if it is determined that the source area in the LUN is entirely a clean area based on the data representation in the persistent memory; and proceeding to process a next source area.

Yet another method feature of the present invention which is optionally included provides a variation of the above-described method embodiments further comprising writing zeroing data to an area in the another LUN corresponding to the source area of the LUN in addition to the preventing reading data from the source area if it is determined that the source area in the LUN is entirely a clean area based on the data representation in the persistent memory.

A still further method feature of the present is a variation of any of the above embodiments wherein the reading and writing of the data includes a LUN reconstruction operation which reconstructs data of a failed storage element of the LUN, from reconstruction data stored in another area in the storage medium and saves the reconstructed data in a functional storage element which is one of a new storage element and a repaired storage element. The LUN reconstruction operation is effect by a method comprising: determining whether a destination area in the functional storage element corresponds to an area of the failed storage element that is entirely a clean area based on the data representation in the persistent memory; reading reconstruction data from the another area if it is not determined that a destination area in the functional storage element corresponds to an area of the failed storage element that is entirely a clean area based on the data representation in the persistent memory, then reconstructing data using the reconstruction data and writing the reconstructed data to the destination area in the functional storage element; preventing reading reconstruction data from the another area and reconstructing data if it is determined that a destination area in the functional storage element corresponds to an area of the failed storage element that is entirely a clean area based on the data representation in the persistent memory; and proceeding to process a next a next area of the failed storage element to be reconstructed.

A still further method feature of the present invention which is optionally included in the above reconstruction embodiment further provides for writing zeroing data to an area in the functional storage element corresponding to an area of the failed storage element in addition to the preventing reading reconstruction data from the another area if it is determined that the destination area in the functional storage element corresponds to an area in the failed storage element that is entirely a clean area based on the data representation in the persistent memory.

Still further, the above method embodiments optionally include the data storage medium being an assemblage of data storage devices.

Yet still further, the above method embodiments optionally embodiments wherein the data representation of the clean areas in the persistent memory is not updated with information tracking further writes to areas not included in the representation of the clean areas.

The above, and other objects, features and advantages of the present invention will become apparent from the following description read in conjunction with the accompanying drawings, in which like reference numerals designate the same elements. The present invention is considered to include all functional combinations of the above described features and is not limited to the particular structural embodiments shown in the figures as examples. The scope and spirit of the present invention is considered to include modifications as may be made by those skilled in the art having the benefit of the present disclosure which substitute, for elements or processes presented in the claims, devices or structures or processes upon which the claim language reads or which are equivalent thereto, and which produce substantially the same results associated with those corresponding examples identified in this disclosure for purposes of the operation of this invention. Combining devices or processes wherein the function or outcome remains the same is considered within the scope and spirit of the present invention, and it is understood that devices, units, or systems may be implemented by hardware, software, firmware or combinations thereof and such implementations remain within the scope and spirit of the present invention and presence thereof is to be determined by function or outcome unless specifically excluded by claim language. Additionally, the scope and spirit of the present invention is intended to be defined by the scope of the claim language itself and equivalents thereto without incorporation of structural or functional limitations discussed in the specification which are not referred to in the claim language itself. Still further it is understood that recitation of the preface of "a" or "an" before an element of a claim does not limit the claim to a singular presence of the element and the recitation may include a plurality of the element unless the claim is expressly limited otherwise. Yet further it will be understood that recitations in the claims which do not include "means for" or "steps for" language are not to be considered limited to equivalents of specific embodiments described herein. It is still further understood that it is within the scope of the present invention to alter execution order of steps in processes detailed herein provided that the outcome of the process includes at least the same outcome and the claims are not limited to a specific order in which operations of the processes are identified unless specifically stated or required by input/output requirements of prior or subsequent operations. Finally, ranges presented in this disclosure are considered to describe and enable sub-ranges of those ranges without specific reference to the sub-ranges as it will be understood that once in possession of a given range, one is also in possession of sub-ranges within the given range.

DETAILED DESCRIPTION

Figure 1:
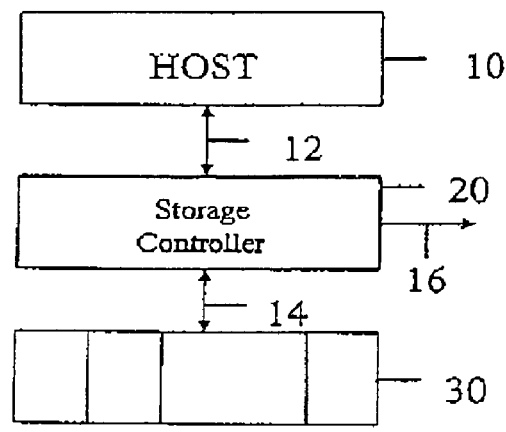
FIG. 1 is a block diagram of a storage control system architecture.

Referring to FIG. 1, a block-level storage device is a disk storage controller 20 which is connected to a host system 10 through an I/O bus, which in addition to user data also carries implementation of a low-level communication protocol such as SCSI. The protocol represents storage as a series of logical units (LUNs) which are implemented on disks 30 and are characterized by a size of a unit of storage, i.e., the SCSI block, and a LUN capacity in terms of that same unit. At present 512 bytes is considered a defacto standard SCSI block size; however, for the present invention this is considered a preferred size based on its acceptance and the present invention is not limited to such a size as other sizes may be adopted as commonly used memory devices increase in size and hardware increases in speed. At the logical unit level, there is no knowledge of files and file properties. It will be understood that while disks 30 are referenced as the storage medium, the present invention will be applicable to other types of storage devices assembled together to define a storage medium such as solid state storage devices, and that unless specifically stated in the claims, the invention is not considered limited to disk applications.

FIG. 1 illustrates known architecture for a storage system. The present invention provides for modifying the operation of prior systems by configuring the storage controller to employ the method described herein and utilize devices as described herein. It will be further understood that the disks 30 need not be in a common physical location with each other or the storage controller 20.

A logical unit is not only "initialized" or "formatted" by the host file system but also is typically initialized by the storage controller 20 before being presented to the file system for the first time. The initialization by the storage controller 20 is required to erase any old configuration data that could be misinterpreted by the file-system; it is also useful in the case of RAID storage to initialize the parity information. Hereinafter, the term "clean" is used to characterize any area of the storage that has not been written to by the host since the LUN initialization and the term "dirty" is used to identify areas with host data.

For the purpose of this application, we will define a block-level archiving system as a storage system where most writes occur in a clean area of the logical unit: there is little "re-write" activity. For example, "most writes" can be considered to be 51% or more, more preferably it will mean 60%, and further preferred ranges are 66% or more and 70% to 100% of the writes occur in a clean area with a remaining percentage of writes being "re-write" activity in a dirty area. The present invention is intended to include any range within these ranges as sub-ranges are herein considered disclosed. The representation of an archiving system is simplified: not all real archives will behave in that fashion, but for most, the model will be acceptable. An extreme example of an archive storage system would be any write-once type storage; in that case there is no rewrite and the only write activity happens in clean areas. In such applications it will be understood that the present invention provides benefits for purposes of LUN copy and LUN reconstruction operations. On the other hand any active database where data is frequently updated would very likely fall in the non-archive category, according to definition.

Figure 2:
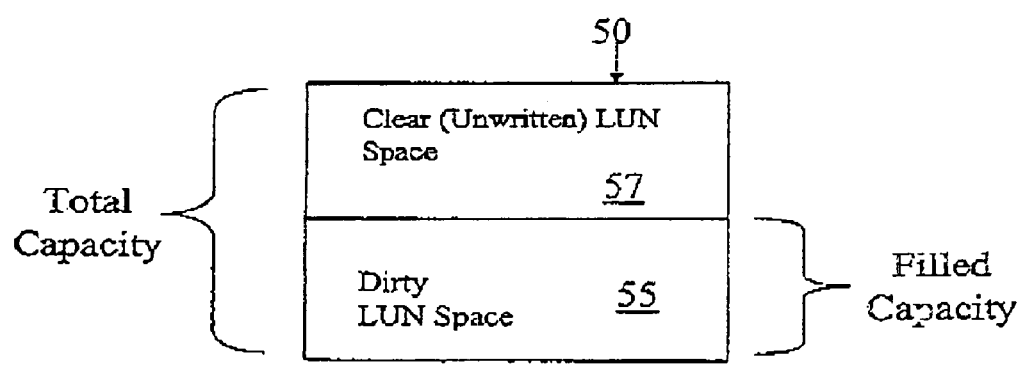
FIG. 2 is a graphical depiction of a LUN space.

Referring to FIG. 2, a LUN space 50 is represented. As those skilled in the art are aware, such a LUN space may be distributed across the disks 30. The LUN space 50 is written to by the storage controller 20 in the block-level archiving system to archive data as defined above. In accordance with the above definition, the LUN space 50 fills like a bucket with an area of the LUN space that is written to being a dirty LUN space 55 and an area which has not been written to since initialization being a clean LUN space 57. Hence, new writes, i.e., new data being written for the first time, are directed to the clean LUN space 57 while change data is directed to the dirty LUN space 55 with the data in the dirty LUN space being considered "old data" because it is updated with new data.

Figure 3:
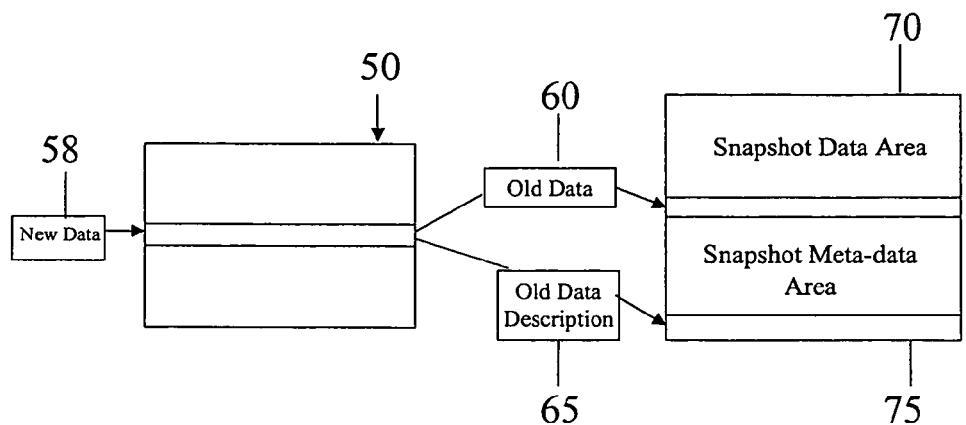
FIG. 3 is a graphical depiction of a snapshot process which performs copy-on-write processing.

Referring to FIG. 3, a LUN snapshot is a representation that allows direct or indirect access to an image of the LUN at a determined time T. The most common way to support a block level snapshot is to journal the old data 60, i.e., the data contained in the SCSI blocks corresponding to any area rewritten with new data 58 after time T into a special snapshot area 70 of the disks 30 reserved for all snapshot activity. The process is commonly described as "copy-on-write." The process writes the SCSI blocks having the old data 60 to a portion of the snapshot data area 70 and a data description 65, i.e. meta-data, of the blocks to a snapshot meta-data area 75. After a start at time T of the snapshot process, if a user wants to access a block of data as it was at time T, a check of meta-data in the snapshot metadata area 75 will indicate whether the data must be read from the snapshot area 70 (it was re-written) or from the original LUN data stored in the LUN space 50. An alternative is to journal the new data; however when the snapshot is invalidated, the new data must be copied back to the original LUN. Regarding FIG. 3, it will be understood by those skilled in the art that the relative size of the meta-data area to the data area for the copy-on-write is vastly exaggerated merely for illustration convenience. For any host write, from a Kilobyte (2 SCSI blocks) to more than a megabyte—depending on the application—, less than a hundred bytes may be enough for the corresponding meta-description. The size ratio of the two areas should approximate that same ratio.

Figure 4A:
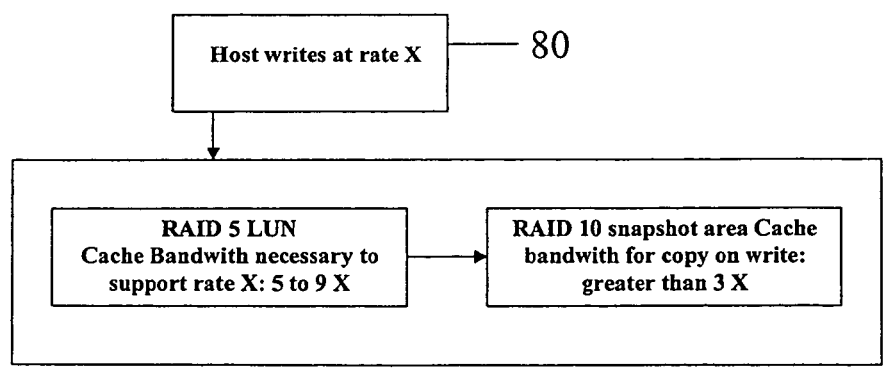
FIG. 4a is a graphical depiction of bandwidth requirements for snapshot processing of FIG. 3.

While implementing the snapshot process at the storage controller device 20 level saves bandwidth and processing on the host, it is very costly for the storage controller device 20. Referring to FIG. 4a, since in a typical prior art system the storage controller device 20 has no knowledge of the file system, a large amount of bandwidth is wasted by the copy-on-write process, by saving areas that do not carry any information, neither in term of user files nor of their metadata. The host initiates a write request 80 at rate X, which requires a cache bandwidth in the storage controller 20 effecting a RAID 5 LUN that is 5X to 9X. Additionally, a RAID 10 snapshot area requires cache bandwidth for a copy-on-write that is greater than 3X.

Figure 4B:
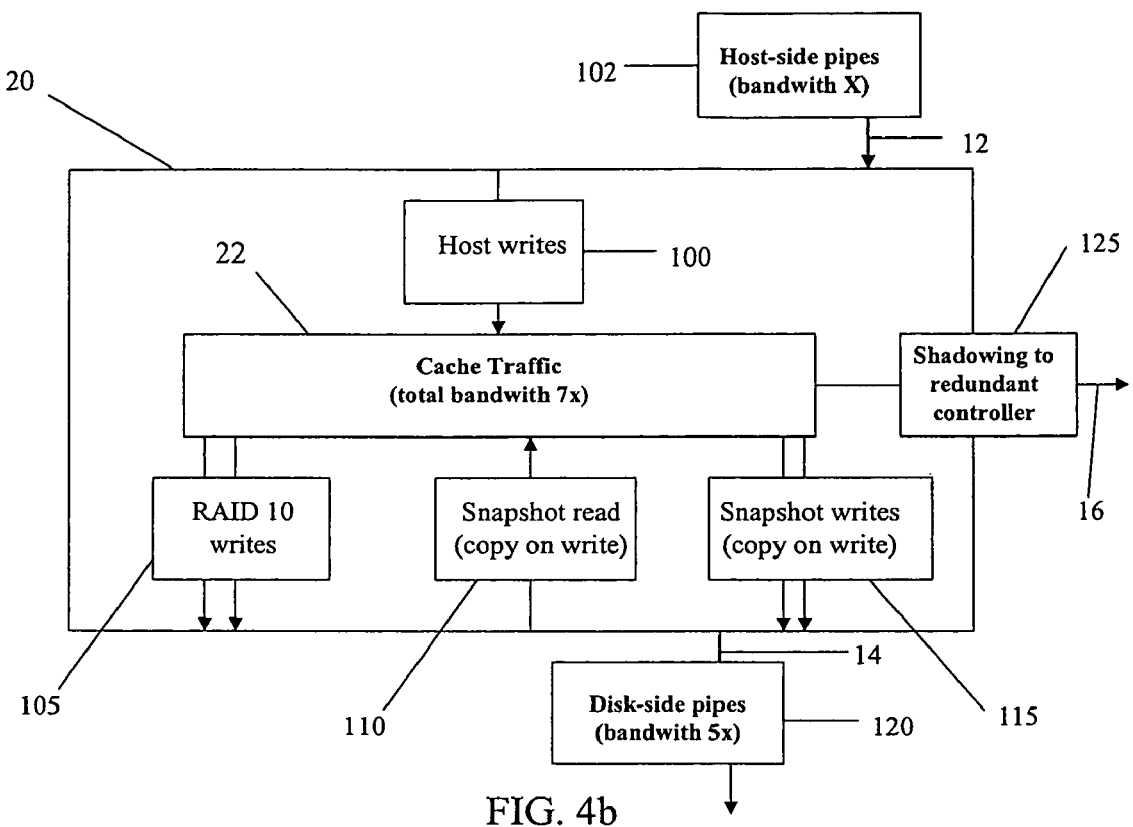
FIG. 4b is a block diagram illustrating bandwidth requirements for a cache memory of the storage controller device.

Referring to FIG. 4b, bandwidth requirements for a cache memory 22 of the storage controller device 20 are illustrated. The host-side pipes 12 carry host writes 100 to the storage controller 20 and have a host-side pipe bandwidth X 102. The host writes 100 are data and instructions for writing new data 58 shown in FIGS. 3 and 5, The host writes 100 are stored in the cache memory 22 of the storage controller 20. The writing of the new data 58 requires two RAID 10 writes 105 for the new data 58, a snapshot read 110 from the snapshot area 70 of FIG. 3 for a copy-on-write processing, and two snapshot writes 115 to effect a copy-on-write processing. Furthermore, since storage systems generally include more than one storage controller for redundancy purposes, yet another write is performed of the host writes 100 in the form of a shadowing write 125 via the pipe 16. This results in a requirement that disk-side pipes 14 provide a bandwidth of 5X and that the cache traffic be supported by a cache bandwidth of 7X.

Figure 5:
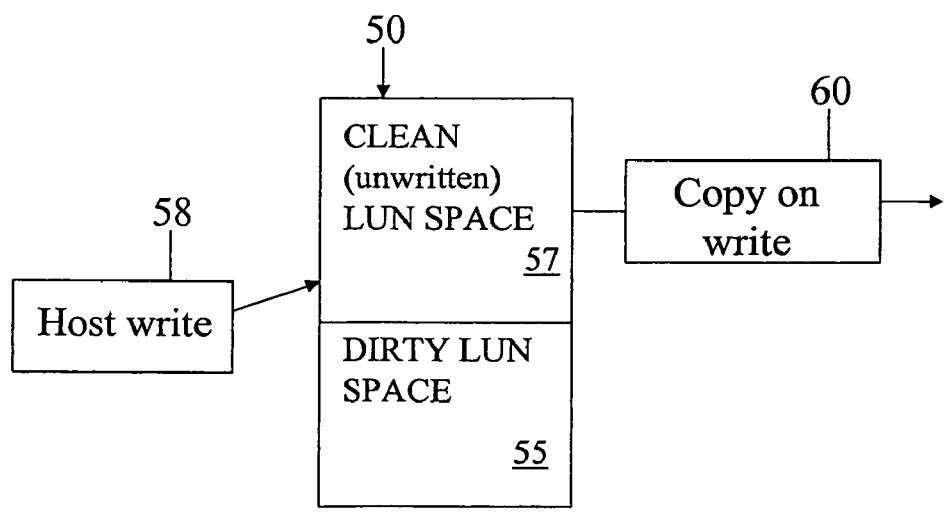
FIG. 5 is a graphical depiction snapshot processing which needlessly consumes bandwidth.

Referring to FIG. 5, the problem has tragic proportions in the case of the typical archiving system since most writes of new data 58 occur in the CLEAR area 57 of the logical units 50. Thus, for a typical write, in the typical archive, the data saved by the copy-on-write, i.e., old data 60, is actually data from a CLEAR area and is meaningless data. It is possible to resolve that issue by implementing a file-system-like structure that describes the DIRTY areas 55 in the LUN 50, however this is done at great cost in processing and overall complexity of the design.

The present invention provides a system and method which, instead of maintaining a file-system-like structure to keep track of dirty areas of the LUN, provides a much simplified tracking data structure that coarsely represents the still clean areas in units of blocks or groups of blocks. In the preferred embodiment, the method obviates tracking writes to dirty LUN space 55. The present invention provides a method that maintains a LUN tracking data structure 155 that includes a "negative impression" of the LUN activity and further simplifies the method by removing finer details.

Instead of storing information identifying areas where data is stored and rewritten, the negative impression identifies areas that are clean and removes indication of those areas once data is written to the clean areas thereby changing their status to a dirty area. The present invention includes several possible implementations, e.g.:

A coarse bitmap keeping track of clean areas at the gigabyte level.

A limited set of (begin-end) pointers.

A more flexible tree structure. (More costly to maintain in terms of space and computing time.)

Such implementations are devices generally known to those skilled in the art and may be effected by those skilled in the art having the benefit of this disclosure to track the clean areas as discussed herein. Hence, explicit description is omitted. It is also considered to be within the scope and spirit of the present invention to adapt other forms of representation of the clean areas provided that the representations identify the clean areas and cease to identify such areas as clean once they are written to and rendered dirty. Preferably, once an area is written to, the method of the invention ceases to track or perform processing for the area for controlling copy-on-write, copy and reconstruction processes beside verifying that the area is not clean, which is done preferably by checking to see if an area is clean and if it is not shown as clean, presuming it is dirty. Hence, if data in a dirty area is updated, no update is required of the LUN tracking data 155 structure, that is, the data structure employed by the present invention is not further updated and associated overhead is obviated. This is in contrast to known systems which track the written areas as to whether and when data is updated and provide snapshots for each change. The present invention eliminates unnecessary copy-on-writes in snapshot archiving systems.

Accordingly, in the preferred embodiment, the present invention omits storing data positively tracking writes to dirty areas, and does not seek to identify dirty areas except in so far as identifying clean areas by process of elimination also identifies dirty areas. It is further understood, that an embodiment of the invention may optionally identify dirty areas, and hence by process of elimination identify clean areas, but will not track further writes to dirty areas besides an initial write since this is unnecessary for the purpose of the present invention to prevent copying or reconstructing clean areas of archive storage while requiring minimal overhead processing by the storage controller 20.

Figure 6A:
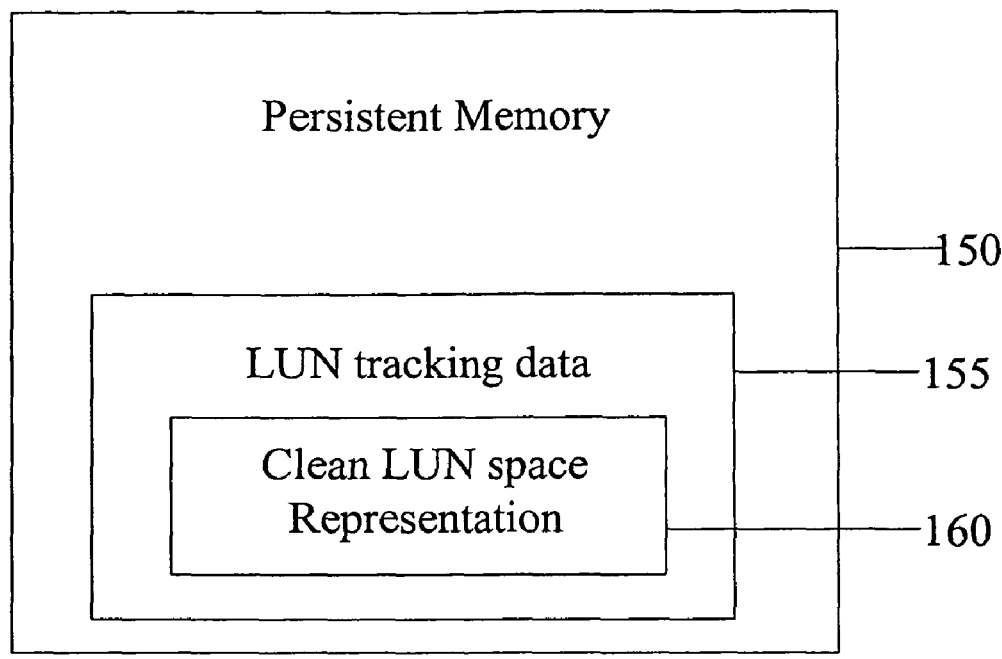
FIGS. 6a-6d are graphical depictions of embodiments of a persistent memory including versions of a LUN tacking data structure of the present invention.
Figure 6B:
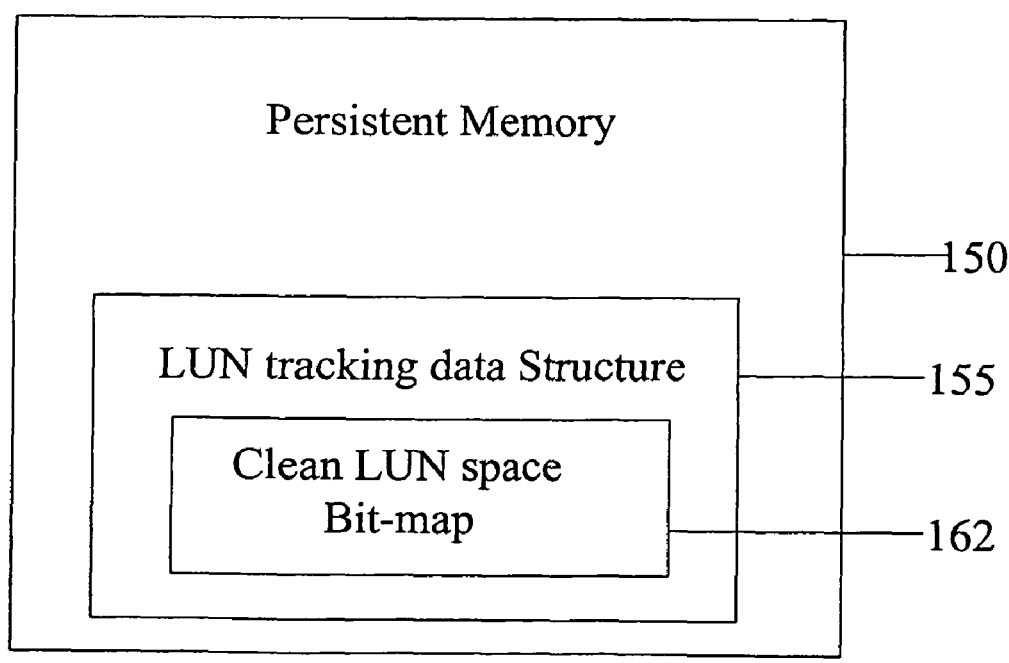
Figure 6C:
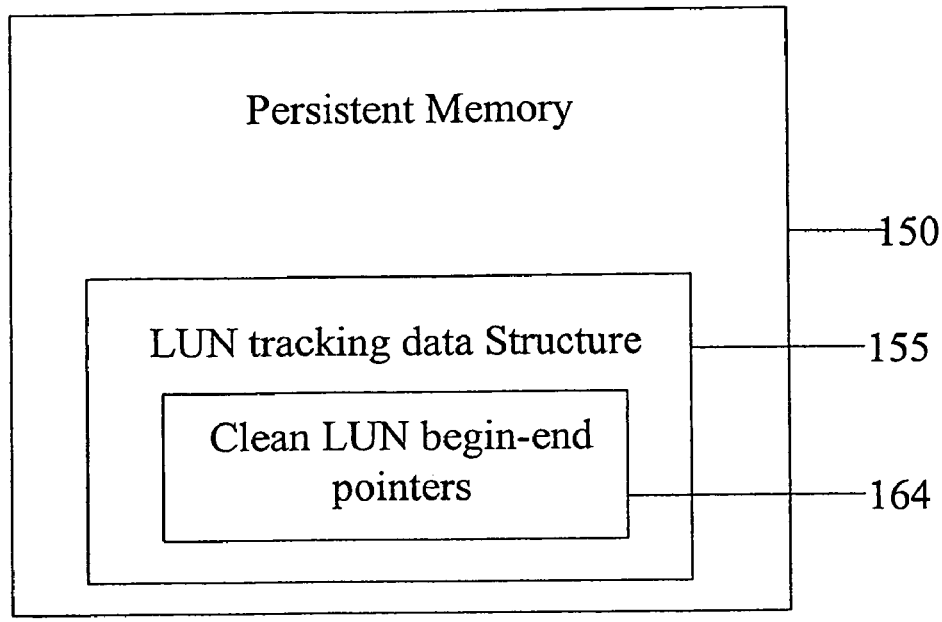
Figure 6D:
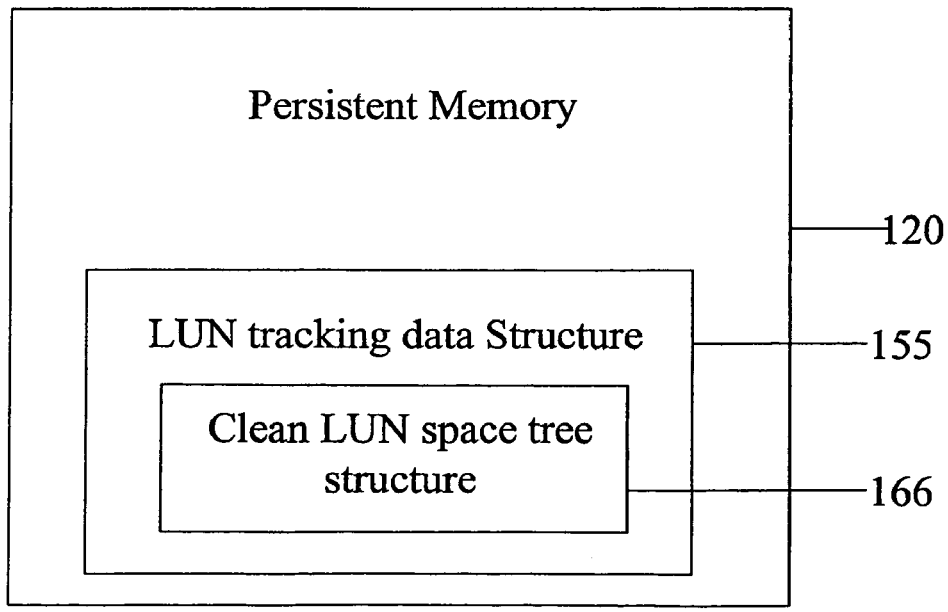

Referring to FIG. 6a, a persistent memory 150 of the present invention is shown in block format and includes a LUN tracking data structure 155 forming a clean LUN space representation 160. The persistent memory 150 may be internal or external to the storage controller 20. Particular alternative embodiments of the present invention include the clean LUN space representation 160 taking on certain forms wherein the persistent memory 150 includes a data structure which is a clean LUN space bit-map representation as shown in FIG. 6b, the persistent memory 150 includes a data structure which provides clean LUN space begin-end pointers data 164, and the persistent memory 150 includes a data structure which is a clean LUN space tree structure 164 identifying clean LUN space. The clean LUN space representation 160 is maintained in the persistent memory 120 and updates to the LUN tracking data structure 155 are done synchronous with changes in the clean areas 57 of the LUN 50. Thus, the structure is preferably to be maintained/created as soon as the LUN 50 is initialized or re-initialized. For purposes of this disclosure, unless stated otherwise, the term "initialize" is understood to include "re-initialization." The structure also has to be available for access throughout the life of the LUN 50 and must be invalidated (or LUN access prevented) if the structure is no longer possible to be updated.

During the snapshot process, when a write occurs, the structure is searched and it is determined whether it occurs in the clean or dirty area of the LUN 50. If the write is to be in the dirty area 55, a copy-on-write is executed. If write is in the clean area 57, the copy-on-write is skipped but the structure is modified to reflect shrinking of the clean LUN space.

Figure 7:
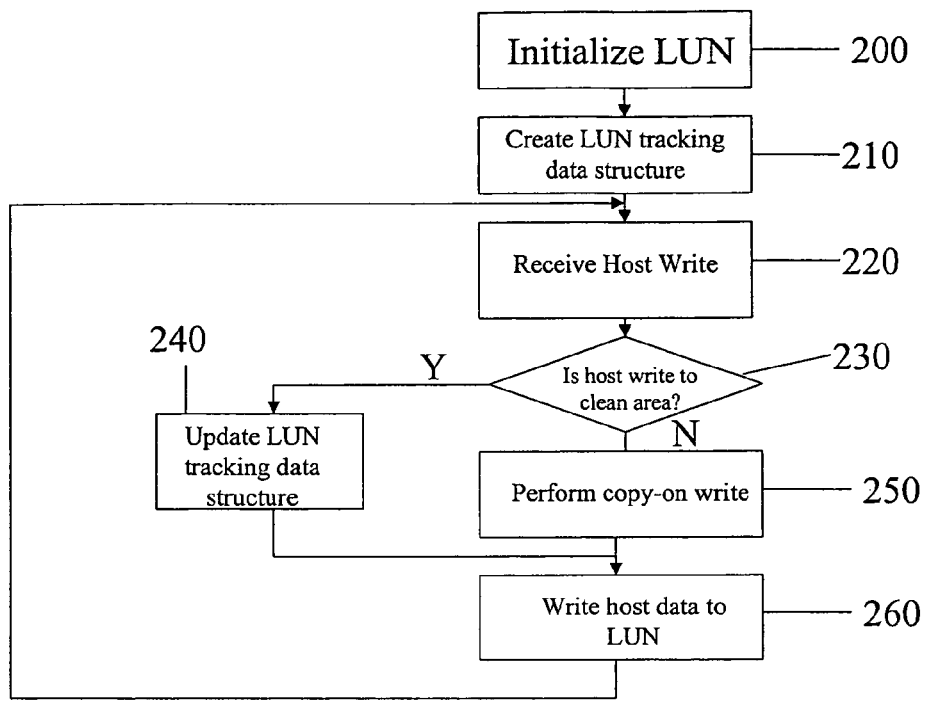
FIG. 7 is a flow chart of an embodiment of a process of the present invention for performing snapshot processing.

An embodiment of the method of the present invention is illustrated in the flow chart of FIG. 7 wherein execution of the embodiment by the storage controller 20 is set forth. In step 200 the storage controller initializes the LUN space 50 in the disks 30. This is done once and is not re-executed unless a new LUN space is to be used or the present space is to be established as new LUN. After initialization, the storage controller proceeds in step 210 to create the LUN tracking data structure 155 in the persistent memory 120. Since the LUN space is just initialized, the whole of the LUN will preferably be denoted as clean LUN space 57. Operation of the storage controller 20 is then devoted to handling requests from the host 10. In step 220 the storage controller receives a write request from the host 10. In step 230 it is determined whether the write request is to an area of the LUN 50 which is designated to be in the clean LUN space 57. If the write request is to write data to a clean area, in step 240 the storage controller 20 then updates the LUN tracking data structure 155 to remove indication that the area in the LUN identified by the write request is clean. If the write request is to write data to a dirty area, the storage controller 20 performs copy-on-write processing in step 250 to copy the pre-existing old data 60 in the LUN space 50 to the snapshot data area 70 and store snapshot meta-data containing old data description data 65 to the snapshot meta-data area 75. In step 260 the write data from the host 10 is written to the designated area of the LUN space 50. When the write is to a dirty area, the storage controller 20 can proceed with step 250 and 260 and on to step 220 without updating the LUN tracking data structure 155 of the present invention.

Figure 8:
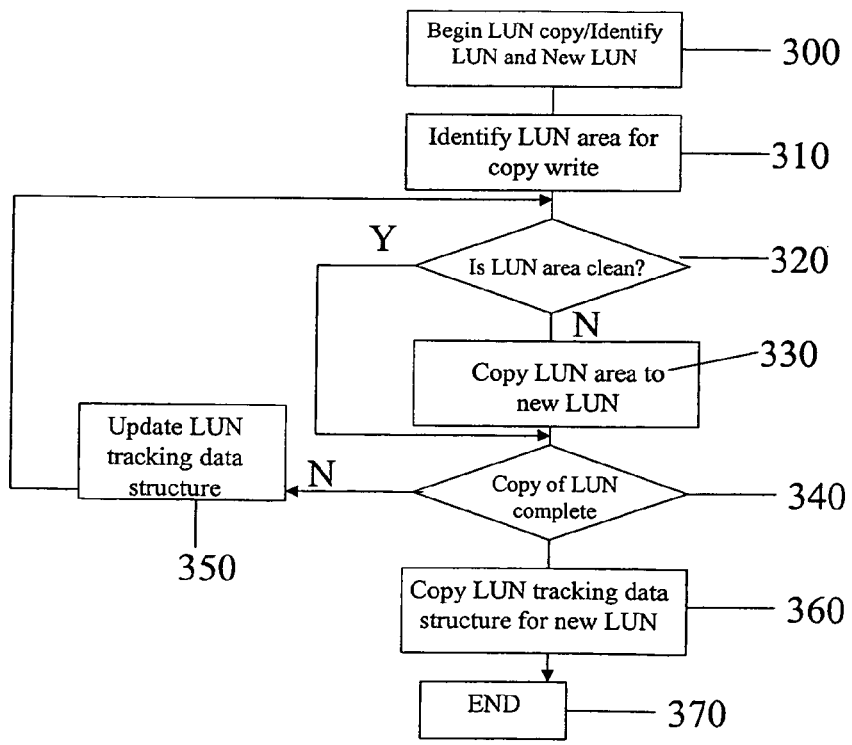
FIG. 8 is a flow chart of an embodiment of a process of the present invention for performing LUN copy processing.

The structure can also be used during LUN copy to skip the copy of any clean area and during disk reconstruct or replacement, to skip unnecessary operations on the clean area of the LUN space. Referring to FIG. 8, an embodiment of a process of the present invention for performing a LUN copy is shown. In step 300 the LUN to be copied is identified and the new LUN is identified. It is understood that LUN's are copied in sections, or areas, one at a time until the entire LUN is copied. In step 310 a first LUN area is identified. In step 320 it is determined whether the LUN area of the LUN 50 to be copied is in the clean LUN space 57. If the LUN area is in a clean area, the storage controller 20 proceeds to step 340 and does not read data from the LUN area and does not perform a copy of the LUN area to the new LUN since the data in the LUN area is meaningless. If the LUN area to be copied is a dirty area, the storage controller performs a copying in step 330 of the old data in the area of the dirty LUN space 55 to a corresponding location in the new LUN. In step 340 it is determined whether the copy of the LUN 50 is complete and if it is not a next LUN area to be copied is identified in step 350. If the copy is complete, the LUN tracking data structure 155 is copied and associated with the new LUN and the process ends at step 370. Once again, bandwidth is saved by identifying the clean LUN areas and not performing a copy of the clean area to the new LUN.

Figure 9:
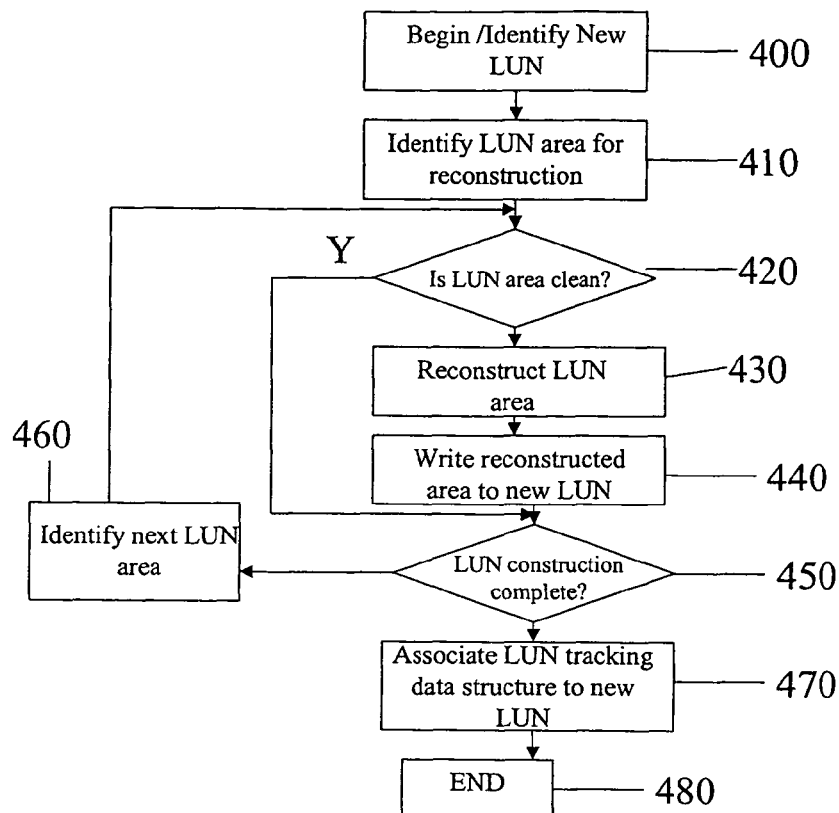
FIG. 9 is a flow chart of an embodiment of a process of the present invention for performing LUN reconstruction.

Referring to FIG. 9, an embodiment of a portion of the present invention is shown for reconstructing a LUN that has failed, i.e., a LUN that has failed storage elements or areas therein. Reconstruction techniques are known to those skilled in the art and the details of reconstruction are omitted from this description. It suffices to say that areas of a failed LUN are reconstructed one at a time using data stored outside of the failed LUN. Such reconstruction is done on a block basis and usually employs known RAID techniques. However, the present invention is not limited to such techniques. In step 400 a new LUN space is identified and/or initialized. In this example it will be presumed that LUN 50 has failed and a new LUN is initialized elsewhere on the disks 30. In step 410 a first LUN area for the reconstruction is identified. In step 420 it is determined whether the LUN area of the LUN 50 to be reconstructed was in the clean LUN space 57.

If the LUN area was in a clean area, the storage controller 20 proceeds to step 450 and does not reconstruct the LUN area and does not perform a write to the corresponding area of the new LUN since the data that was in the LUN area of failed LUN 50 is meaningless. Alternatively, the storage controller may simply perform a write to re-zero the corresponding are of the new LUN to ensure that a consistent parity or shadow exists. In such instance no actual data is written to the LUN.

If the LUN area to be copied is a dirty area, the storage controller performs a reconstruction process for the LUN area in step 430 of the old data in the area of the dirty LUN space 55 and writes the reconstructed data to a corresponding location in the new LUN in step 440. In step 450 it is determined whether the reconstruction of the LUN 50 is complete and if it is not a next LUN area to be reconstructed and written is identified in step 460. If the reconstruction is complete, the LUN tracking data structure 155 is associated with the new LUN in step 470 and the process ends at step 480. Again, bandwidth is saved by identifying the clean LUN areas and not performing a reconstruction and write of meaningless data from the clean area to the new LUN.

Figure 10A:
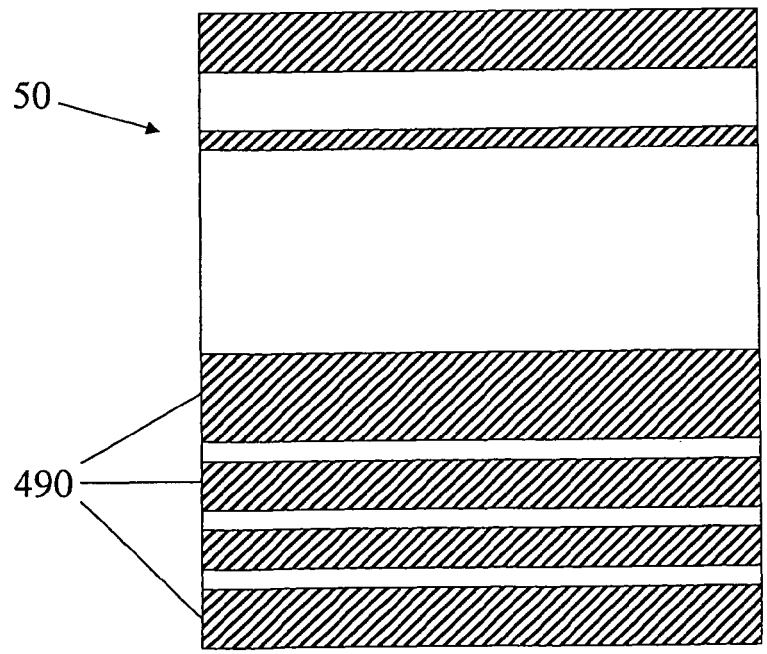
FIG. 10 is a graphical representation of operation of an embodiment of the present invention wherein representation of clean areas is simplified so as to coarsely represent clean areas.
Figure 10B:
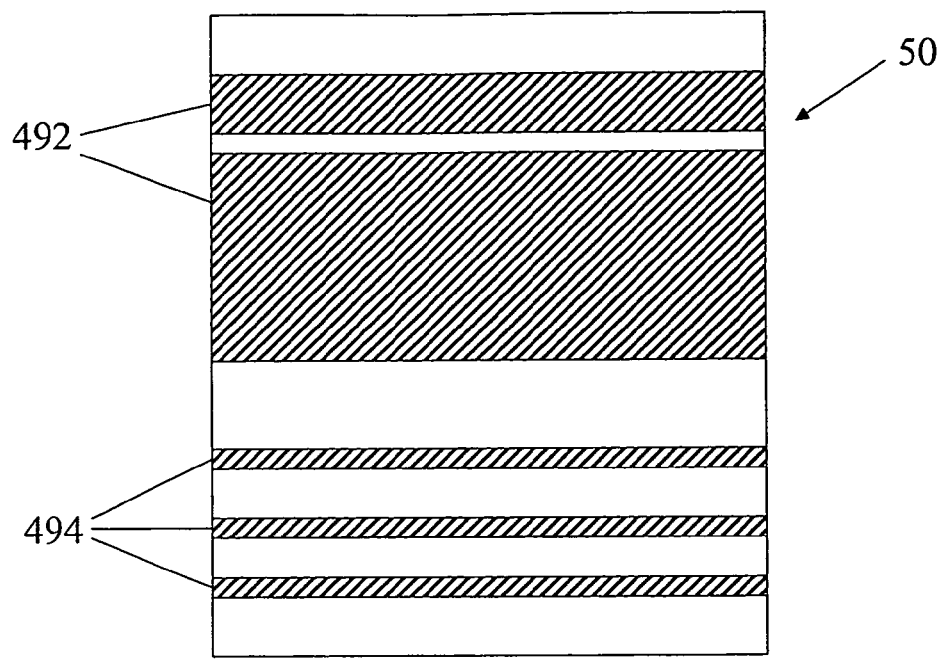
Figure 10C:
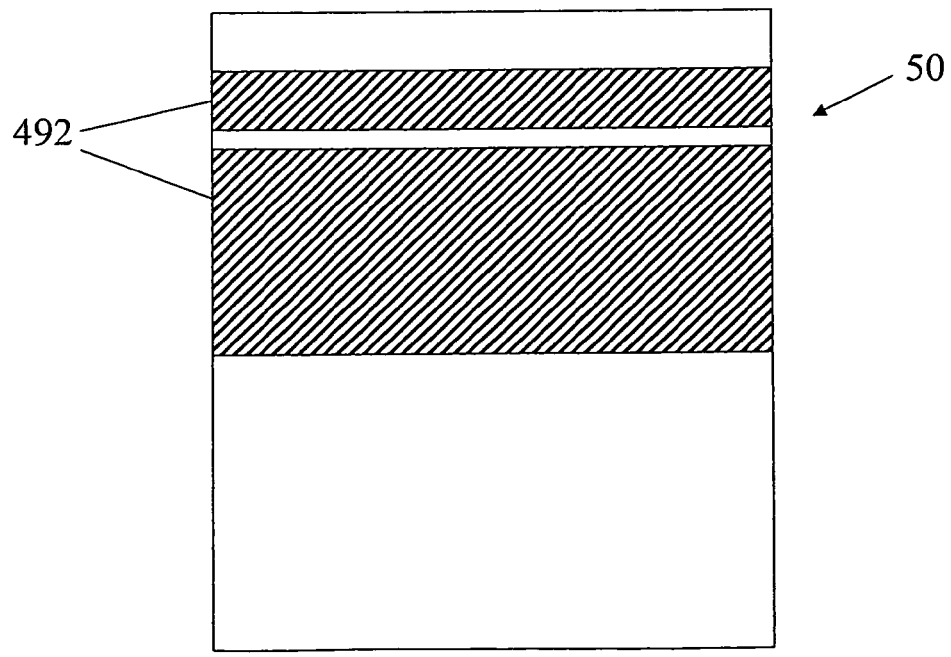

Referring to FIGS. 10*a*-10*c*, graphical depictions of the LUN 50 are shown wherein dirty and clean areas are illustrated. In FIG. 10*a* LUN dirty areas 490 are hatched and represent how a file-system-like structure would represent the LUN used, i.e., dirty space. FIG. 10*b* shows a graphical depiction of a negative, i.e., negative impression, of the LUN 50 shown in FIG. 10*a* wherein the LUN clean areas 492 and 494 are hatched and represent the LUN unused space. FIG. 10*c* shows a graphical representation which illustrates a modification of the present invention to keep the representation simple, wherein the smallest clean areas are ignored.

In a preferred embodiment, a granularity of about 10 GB for the negative representation of the storage space represented in FIGS. 10*a*-10*c* (The granularity is a parameter of the system, typically ranging from less than a gigabyte to more than 100 gigabytes—for the most simplified representations—). In the instance of FIG. 10*c*, the smaller LUN clean areas 494 are dropped to produce the simplified negative representation shown in FIG. 10, because for each of them, their start and end addresses were contained in a same 10 GB fragment. Depending on the size of the system the granularity employed is optionally in a range of 1 GB to 100 GB, and it is envisioned that the range is extended to 1 TB in massive storage systems. It will be understood that the relative sizes of areas in FIGS. 10*a*-10*c* to total area and each other is not to scale and representation is simplified for illustration purposes Since savings of bandwidth by omitting copy-on-write for small clean areas 494 is minimal, and overhead is required to track the small clean areas 494, it will be evident to one skilled in the having the benefit of the present disclosure that a tradeoff exists of overhead processing for tracking the small clean areas versus saving bandwidth on copy-on-write, LUN copies, and LUN reconstruction for the clean areas 492 and 494. Thus, such considerations will dictate the clean areas below a certain determined size be eliminated from the clean LUN space representation 155 as shown in FIG. 10*c* wherein the small clean areas 494 are omitted and the large clean areas 492 remain.

Figure 11:
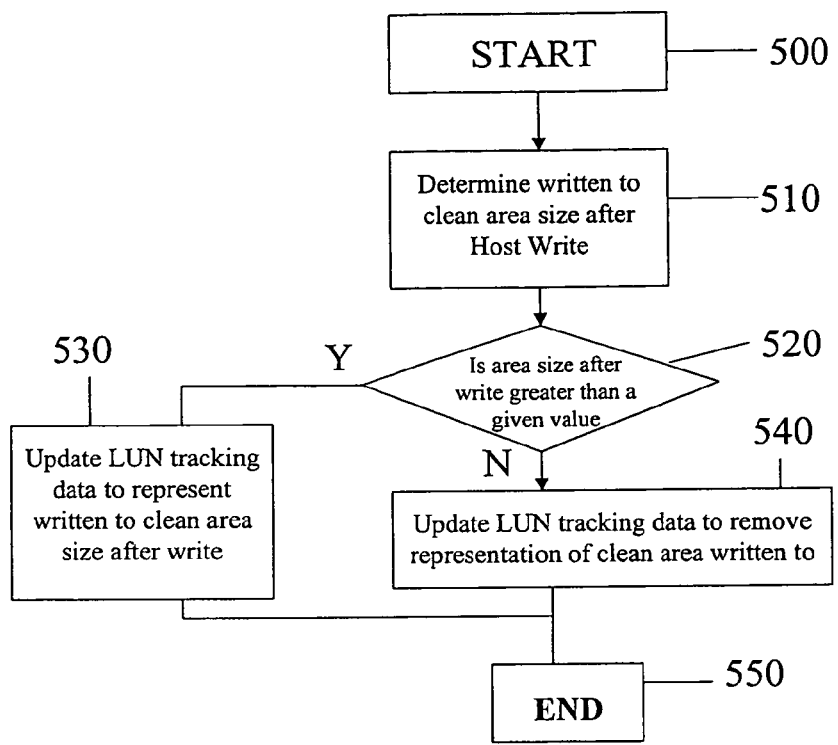
FIG. 11 is a flow chart of an embodiment of a sub-process of the present invention for updating clean area representation data.

Referring to FIG. 11, an embodiment of a sub-process of the step 240 of FIG. 7 is shown wherein one possible implementation of the above-noted simplification of the clean LUN space representation 155 is illustrated. The process begins at step 500 whereat a prior determination has been made that a write to a clean LUN space is to be made. The process proceeds to determine a size of the to be written to clean area after the request host write is effected. In other words, where there is a contiguous clean area in the LUN, and the contiguous clean area is reduced in size by writing to the contiguous clean area, the reduced size is determined. It is then determined whether the reduced size is greater than a given predetermined value in step 520. If the size is less than such a value, step 540 is executed to update the LUN tracking data structure 155 to remove representation of the clean area to be written to including the clean area remaining after the write which is less than the given predetermined value. Such a predetermined value may be in the range of 100 GB, and is more preferably in the range of 10 GB, and is still more preferably in the range of 1 GB. Alternatively, in terms of percentages of the total LUN 50, the value may be in the range of 10 percent, and is more preferably in the range of 1 percent, and is still more preferably in the range of one tenth of one percent. If size is equal to or greater than such predetermined value, step 530 is executed to update the LUN tracking data structure 155 to represent the clean area of the contiguous clean area which will remain after the host write is effected. The sub-process then ends at step 500.

In the present state of technology, persistent memory is either expensive or relatively slow to access. The use of this invention is most advantageous if LUN usage is friendly to the scheme, however the system may be implemented with either expensive persistent storage or slower less expensive system storage. It is expected that fast less expensive persistent storage device will be available and the present invention includes use of such devices in the future. If the LUN usage corresponds to the archiving system as defined above, the benefit of its use in an environment where snapshots are common is clear. In many environments, the situation will be less clear but it should be evident that the system can easily monitor and disable itself when a programmed level of efficiency is not reached.

Through the use of the above described present invention a significant saving in the disk usage and overall use of the disk storage controller bandwidth (both cache and I/O channel) is achieved during the snapshot process for an archiving storage device. The cost of that improvement is the price of a small area of persistent storage and the overhead of an update of the structure maintained in that persistent area of memory.

Significant savings are also be achieved during a LUN copy or disk copy process in the early stages of the LUN life (while the clear areas of the LUN occupy more space than the dirty areas) for any type of storage controller. Once the dirty areas of the LUN exceed a predetermined percentage, the method of the present invention is optionally discontinued. Such a predetermined percentage may be 66% or greater.

Significant savings are also to be achieved during a disk reconstruct in the early stages of a LUN life for RAID controllers. Since this affects the reliability of the storage it also justifies the use of this invention whether or not the storage system behaves like an archive.

The use of block-level snapshots is common throughout the industry and the use of archiving storage for compliance and/or very long-term storage is also in constant acceleration. The problem discussed above is largely ignored but has significant impact on the storage controller bandwidth and its disk usage.

The impact of the proposed improvement would also be significant for all general-purpose storage systems in the early stages of a LUN life and, insofar as it reduces reconstruction time, will also have a positive effect on the reliability of the system.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Such modifications include substitution of components for components specifically identified herein, wherein the substitute components provide functional results which permit the overall functional operation of the present invention to be maintained. Such substitutions are intended to encompass presently known components and components yet to be developed which are accepted as replacements for components identified herein and which produce results compatible with operation of the present invention. Furthermore, while examples have been provided illustrating operation in certain ranges and rates, the present invention as defined in this disclosure and claims appended hereto is not considered limited to the ranges and rates levels recited herein. It is furthermore to be understood that the storage devices referenced herein are not considered limited to any particular types of storage devices nor any particular protocol of signals. Furthermore, the signals used in this invention are considered to encompass any electromagnetic wave transmission.

What is claimed is:

1. A storage system for effecting a block-level protocol connection between a host and a data storage medium for writing data from the host to a first storage area of the data storage medium, and for writing data from the first storage area to a second storage area, the storage system comprising:
    means for initializing a logical unit (LUN) in the first storage area;
    a persistent memory storing a data representation of clean areas in the LUN which have not been written to since the initialization;
    a writing system for receiving data to be written from the host to a destination area in the LUN and saving said received data in a cache memory;
    said writing system being configured to examine said data representation of said clean areas and determine if the destination area in the LUN is a clean area based on the data representation in the persistent memory;
    said writing system removing, from said data representation of said clean areas in said persistent memory, an area containing the destination area when it is determined that the destination area in the LUN is a clean area;
    said writing system not altering said data representation in said persistent memory when it is determined that the destination area in the LUN is not a clean area; and
    said storage system including a read/write controller which effects reading and writing of data to and from said LUN, said read/write controller being configured to carry out said reading and writing of data to and from said LUN except when an area in said LUN which is a target of either said reading and writing of data is determined to be a clean area based on the data representation in the persistent memory.

2. The storage system of claim 1 wherein said writing system removes, from said data representation of said clean areas in said persistent memory, a contiguous clean area when it is determined that the contiguous clean area which will remain after a write to the LUN is less than a predetermined size.

3. The storage system of claim 2 wherein said LUN is divided into fragments of a predetermined size, said writing system removes the contiguous clean area which will remain after a write to the LUN when a start address and an end address of the contiguous clean area that will remain are contained in a common fragment, and said predetermined size is in a range of about 1 GB to about 100 GB.

4. The storage system of claim 3 wherein said predetermined size is about 10 GB.

5. The storage system of claim 2 wherein said read/write controller is configured to include:
    a first copying device for reading data from the destination area in the LUN and writing said read data to the second storage area to thereby copy said read data as a snapshot, if it is not determined that the destination area in the LUN is entirely a clean area based on the data representation in the persistent memory, and then storing the received data from the host to the destination area of the LUN; and
    a second copying device for storing the received data from the host to the destination area of the LUN without first copying data from the destination area in the LUN to the second storage as a snapshot if it is determined that the destination area in the LUN is entirely a clean area based on the data representation in the persistent memory.

6. The storage system of claim 5 wherein said destination area is at least one block level in size.

7. The storage system of claim 2 wherein:
said read/write controller is configured such that said reading and writing of said data includes a LUN copy operation which copies data of said LUN to another LUN in said storage medium; and
said read/write controller includes:
a first copying device for reading data from a source area in the LUN if it is not determined that the source area in the LUN is entirely a clean area based on the data representation in the persistent memory, then writing said read data to a corresponding area in said another LUN to thereby copy said read data, and proceeding to process a next source area; and
a second copying device for preventing reading data from said source area if it is determined that the source area in the LUN is entirely a clean area based on the data representation in the persistent memory, and for proceeding to process a next source area.

8. The storage system of claim 7 wherein said second copying device writes zeroing data to an area in said another LUN corresponding to said source area of said LUN in addition to said preventing reading data from said source area if it is determined that the source area in the LUN is entirely a clean area based on the data representation in the persistent memory.

9. The storage system of claim 2 wherein:
said read/write controller is configured such that said reading and writing of said data includes a LUN reconstruction operation which reconstructs data of a failed storage element of said LUN from reconstruction data stored in another area in said storage medium and saves said reconstructed data in a functional storage element which is one of a new storage element and a repaired storage element; and
said read/write controller includes:
a first reconstruction device for reading reconstruction data from said another area if it is not determined that a destination area in the functional storage element corresponds to an area of the failed storage element that is entirely a clean area based on the data representation in the persistent memory, then for operating to reconstruct data using said reconstruction data and write said reconstructed data to the destination area in said functional storage element, and proceeding to process a next a next area of said failed storage element to be reconstructed; and
a second reconstruction device for preventing reading reconstruction data from said another area and reconstructing data if it is determined that a destination area in the functional storage element corresponds to an area of the failed storage element that is entirely a clean area based on the data representation in the persistent memory, and for proceeding to process a next a next area of said failed storage element to be reconstructed.

10. The storage system of claim 9 wherein said second reconstruction device writes zeroing data to an area in said functional storage element corresponding to an area of said failed storage element in addition to said preventing reading reconstruction data from said another area if it is determined that the destination area in the functional storage element corresponds to an area in the failed storage element that is entirely a clean area based on the data representation in the persistent memory.

11. The controller of claim 1 wherein the data storage medium is an assemblage of data storage devices.

12. The controller of claim 1 wherein said data representation of said clean areas in said persistent memory is not updated with information tracking further writes to areas not included in the representation of said clean areas.

13. A method for reducing cache bandwidth usage in a storage system effecting a block-level protocol connection between a host and a data storage medium for writing data from the host to a first storage area of the data storage medium, and for writing data from the first storage area to a second storage area, the method comprising:
initializing a logical unit (LUN) in the first storage area;
storing in a persistent memory a data representation of clean areas in the LUN which have not been written to since the initialization;
receiving data to be written from the host to a destination area in the LUN and saving said received data in a cache memory;
examining said data representation of said clean areas and determining if the destination area in the LUN is a clean area based on the data representation in the persistent memory;
removing, from said data representation of said clean areas in said persistent memory, representation of an area containing the destination area when it is determined that the destination area in the LUN is a clean area;
not altering said data representation in said persistent memory when it is determined that the destination area in the LUN is not a clean area; and
effecting reading and writing of data to and from said LUN except when an area in said LUN which is a target of either said reading and writing of data is determined to be a clean area based on the data representation in the persistent memory.

14. The method of claim 13 wherein said removing, from said data representation of said clean areas in said persistent memory, removes a contiguous clean area when it is determined that the contiguous clean area which will remain after a write to the LUN is less than a predetermined size.

15. The method of claim 14 wherein said LUN is divided into fragments of a predetermined size, and said removing the contiguous clean area which will remain after a write to the LUN is done when a start address and an end address of the contiguous clean area that will remain are contained in a common fragment, and said predetermined size is in a range of about 1 GB to about 100 GB.

16. The method of claim 15 wherein said predetermined size is about 10 GB.

17. The method of claim 14 wherein said effecting said reading and writing of said data includes a LUN snapshot process comprising:
determining whether the destination area in the LUN is entirely a clean area based on the data representation in the persistent memory;
reading data from the destination area in the LUN and writing said read data to the second storage area to thereby copy said read data as a snapshot, if it is not determined that the destination area in the LUN is entirely a clean area based on the data representation in the persistent memory, and then storing the received data from the host to the destination area of the LUN; and
storing the received data from the host to the destination area of the LUN without first copying data from the destination area in the LUN to the second storage as a snapshot if it is determined that the destination area in the LUN is entirely a clean area based on the data representation in the persistent memory.

18. The method of claim 17 wherein said destination area is at least one block level in size.

19. The method of claim 14 wherein said reading and writing of said data includes a LUN copy operation which copies data of said LUN to another LUN in said storage medium, said LUN copy operation comprising:
   determining whether a source area in the LUN is entirely a clean area based on the data representation in the persistent memory;
   reading data from the source area in the LUN if it is not determined that the source area in the LUN is entirely a clean area based on the data representation in the persistent memory, then writing said read data to a corresponding area in said another LUN to thereby copy said read data;
   preventing reading data from said source area if it is determined that the source area in the LUN is entirely a clean area based on the data representation in the persistent memory; and
   proceeding to process a next source area.

20. The method of claim 19 further comprising writing zeroing data to an area in said another LUN corresponding to said source area of said LUN in addition to said preventing reading data from said source area if it is determined that the source area in the LUN is entirely a clean area based on the data representation in the persistent memory.

21. The method of claim 14 wherein said reading and writing of said data includes a LUN reconstruction operation which reconstructs data of a failed storage element of said LUN, from reconstruction data stored in another area in said storage medium and saves said reconstructed data in a functional storage element which is one of a new storage element and a repaired storage element, the LUN reconstruction operation comprising:
   determining whether a destination area in the functional storage element corresponds to an area of the failed storage element that is entirely a clean area based on the data representation in the persistent memory;
   reading reconstruction data from said another area if it is not determined that a destination area in the functional storage element corresponds to an area of the failed storage element that is entirely a clean area based on the data representation in the persistent memory, then reconstructing data using said reconstruction data and writing said reconstructed data to the destination area in said functional storage element;
   preventing reading reconstruction data from said another area and reconstructing data if it is determined that a destination area in the functional storage element corresponds to an area of the failed storage element that is entirely a clean area based on the data representation in the persistent memory; and
   proceeding to process a next a next area of said failed storage element to be reconstructed.

22. The method of claim 21 further comprising writing zeroing data to an area in said functional storage element corresponding to an area of said failed storage element in addition to said preventing reading reconstruction data from said another area if it is determined that the destination area in the functional storage element corresponds to an area in the failed storage element that is entirely a clean area based on the data representation in the persistent memory.

23. The method of claim 14 wherein the data storage medium is an assemblage of data storage devices.

24. The method of claim 14 wherein said data representation of said clean areas in said persistent memory is not updated with information tracking further writes to areas not included in the representation of said clean areas.

25. A storage controller for connection to a host and for writing data from the host to a storage device, and for writing data from the storage device to an archive storage device, the storage controller comprising:
   means for initializing a logical unit (LUN) in the storage device;
   a persistent memory storing a data representation of clean areas in the LUN which have not been written to since the initialization and dirty areas of the LUN which have been written to after the initialization;
   a writing means for receiving data to be written from the host to a destination area in the LUN, said writing means determining if the destination area in the LUN is a clean area as indicated in the persistent memory;
   said writing means including a first copying means for copying data from the destination area in the LUN to the archive storage device as a snapshot if it is not determined that the destination area in the LUN is entirely a clean area and then storing the received data from the host to the destination area of the LUN; and
   said writing means including a second copying means for storing the received data from the host to the destination area of the LUN without first copy data from the destination area in the LUN to the archive storage device as a snapshot if it is determined that the destination area in the LUN is entirely a clean area.

* * * * *

UNITED STATES PATENT AND TRADEMARK OFFICE
CERTIFICATE OF CORRECTION

PATENT NO.        : 7,930,499 B2  
APPLICATION NO.   : 12/228768  
DATED             : April 19, 2011  
INVENTOR(S)       : Raymond Duchesne Page 1 of 1

It is certified that error appears in the above-identified patent and that said Letters Patent is hereby corrected as shown below:

Column 15, line 51: delete second occurrence of "a next".

Column 15, line 60: delete "a next".

Column 18, line 7: delete second occurrence of "a next".

Signed and Sealed this
Twelfth Day of July, 2011

David J. Kappos
*Director of the United States Patent and Trademark Office*